United States Patent
Chen et al.

(10) Patent No.: US 11,908,080 B2
(45) Date of Patent: Feb. 20, 2024

(54) GENERATING SURFACES WITH ARBITRARY TOPOLOGIES USING SIGNED DISTANCE FIELDS

(71) Applicant: TENCENT AMERICA LLC, Palo Alto, CA (US)

(72) Inventors: Weikai Chen, Shenzhen (CN); Weiyang Li, Shenzhen (CN); Bo Yang, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 102 days.

(21) Appl. No.: 17/713,129

(22) Filed: Apr. 4, 2022

(65) Prior Publication Data
US 2023/0316646 A1    Oct. 5, 2023

(51) Int. Cl.
| | | |
|---|---|---|
| *G06T 17/00* | (2006.01) | |
| *G06T 17/20* | (2006.01) | |
| *G06T 19/00* | (2011.01) | |
| *G06V 10/764* | (2022.01) | |
| *G06T 7/50* | (2017.01) | |
| *G06V 10/774* | (2022.01) | |
| *G06V 10/82* | (2022.01) | |

(52) U.S. Cl.
CPC ............... *G06T 17/20* (2013.01); *G06T 7/50* (2017.01); *G06T 19/006* (2013.01); *G06V 10/764* (2022.01); *G06V 10/7747* (2022.01); *G06V 10/82* (2022.01); *G06T 2200/08* (2013.01); *G06T 2207/10028* (2013.01); *G06T 2207/20081* (2013.01); *G06T 2207/20084* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 10,872,228 B1 | 12/2020 | Zhou et al. | |
| 2002/0130888 A1* | 9/2002 | Perry | G06T 19/20 345/619 |
| 2011/0282473 A1* | 11/2011 | Pavlovskaia | G06T 7/13 700/98 |
| 2012/0194516 A1* | 8/2012 | Newcombe | G06T 17/00 345/420 |
| 2012/0306876 A1* | 12/2012 | Shotton | G06T 17/10 345/424 |
| 2015/0228114 A1* | 8/2015 | Shapira | G06T 15/08 345/421 |

(Continued)

OTHER PUBLICATIONS

Tencent Technology, ISRWO, PCT/US2022/046010, Jan. 31, 2023, 13 pgs.

*Primary Examiner* — Martin Mushambo
(74) *Attorney, Agent, or Firm* — Morgan, Lewis & Bockius LLP

(57) ABSTRACT

The various embodiments described herein include methods, devices, and systems for generating object meshes. In some embodiments, a method includes obtaining a trained classifier, and an input observation of a 3D object. The method further includes generating a three-pole signed distance field from the input observation using the trained classifier. The method also includes generating an output mesh of the 3D object from the three-pole signed distance field; and generating a display of the 3D object from the output mesh.

20 Claims, 11 Drawing Sheets

(56) References Cited

U.S. PATENT DOCUMENTS

| | | | | |
|---|---|---|---|---|
| 2015/0294499 A1* | 10/2015 | Wagner | ............... | H04N 13/204 |
| | | | | 348/46 |
| 2018/0095276 A1* | 4/2018 | Ng-Thow-Hing | ...... | G06F 3/016 |
| 2019/0197786 A1* | 6/2019 | Molyneaux | ............... | G06T 7/50 |
| 2019/0362235 A1* | 11/2019 | Xu | ............... | G06N 3/04 |
| 2019/0362544 A1* | 11/2019 | Pekelny | ................. | G06T 15/08 |
| 2019/0388123 A1* | 12/2019 | Pavlovskaia | ............ | G06T 19/00 |
| 2020/0110158 A1* | 4/2020 | Ecins | .................... | G05D 1/024 |
| 2020/0357158 A1* | 11/2020 | Zhang | ................... | G06F 3/147 |
| 2021/0201526 A1* | 7/2021 | Moloney | ............... | G06N 3/082 |

\* cited by examiner

GENERATING SURFACES WITH ARBITRARY TOPOLOGIES USING SIGNED DISTANCE FIELDS

TECHNICAL FIELD

This relates generally to object surface generation and particularly to using signed distance fields for object mesh generation.

BACKGROUND

Geometric three-dimensional (3D) representation of objects is important for many tasks in the computer vision and computer graphics fields. Various approaches to 3D representations have been studied over the past years, including meshes, voxels, and point clouds. However, many approaches to generating 3D representations are limited to closed surfaces as they require the space to be divided into an inside portion and an outside portion.

SUMMARY

The choice of representation for 3D shapes and surfaces is significant for effective 3D learning. Recently, the advent of neural implicit functions (NIF) has brought advances to learning-based 3D reconstruction and modeling. Classic NIF approaches are built upon the signed distance function (SDF). These approaches train a deep neural network to classify continuous 3D locations as inside or outside the surface via occupancy prediction or regressing the SDF. However, they can only model closed surfaces that support an in-or-out test for level surface extraction. Using an unsigned distance function (UDF) allows for learning open surfaces from point clouds. However, instantiating an unsigned distance field into an explicit mesh is computationally challenging and prone to artifacts.

In some embodiments of the present disclosure, a new learnable implicit representation, referred to as a three-pole signed distance function (3PSDF), is used to represent highly intricate geometries containing both closed and open surfaces with high fidelity. The 3PSDF inherits benefits of SDF, making the learning component an easy-to-train classification task. The 3PSDF is also compatible with classic iso-surface extraction techniques, e.g., the Marching Cubes algorithm, to achieve efficient field-to-mesh conversion. An important aspect of the 3PSDF approach is the inclusion of a direction-less sign (e.g., the NULL sign) into the conventional binary signed distance function. For example, points with the direction-less sign are assigned a not-a-number (NaN) value, preventing a decision boundary from being formed between the NaN values and their neighbors. By properly distributing the direction-less signs over the space, surfaces with arbitrary topologies can be cast. As an example, a neural network is trained to classify continuous points into the three categories: inside, outside, and direction-less. The resulting labels can be converted back to the 3PSDF using a simple mapping function to obtain meshing result.

Accordingly, in one aspect, some embodiments include a method performed at a computing system having memory and one or more processors. The method includes: (i) obtaining a trained classifier; (ii) obtaining an input observation of a 3D object; (iii) generating a three-pole signed distance field from the input observation using the trained classifier; (iv) generating an output mesh of the 3D object from the three-pole signed distance field; and (v) generating a display of the 3D object from the output mesh.

In another aspect, some embodiments include a computing system having one or more processors; memory; and one or more programs stored in the memory and configured for execution by the one or more processors. The one or more programs include instructions for: (i) obtaining a trained classifier; (ii) obtaining an input observation of a 3D object; (iii) generating a three-pole signed distance field from the input observation using the trained classifier; (iv) generating an output mesh of the 3D object from the three-pole signed distance field; and (v) generating a display of the 3D object from the output mesh.

Thus, systems and devices are provided with methods for object surface generation, thereby increasing the effectiveness, efficiency, and user satisfaction with such systems and devices. Such systems, devices, and methods optionally complement or replace conventional systems, devices, and methods for object surface generation.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
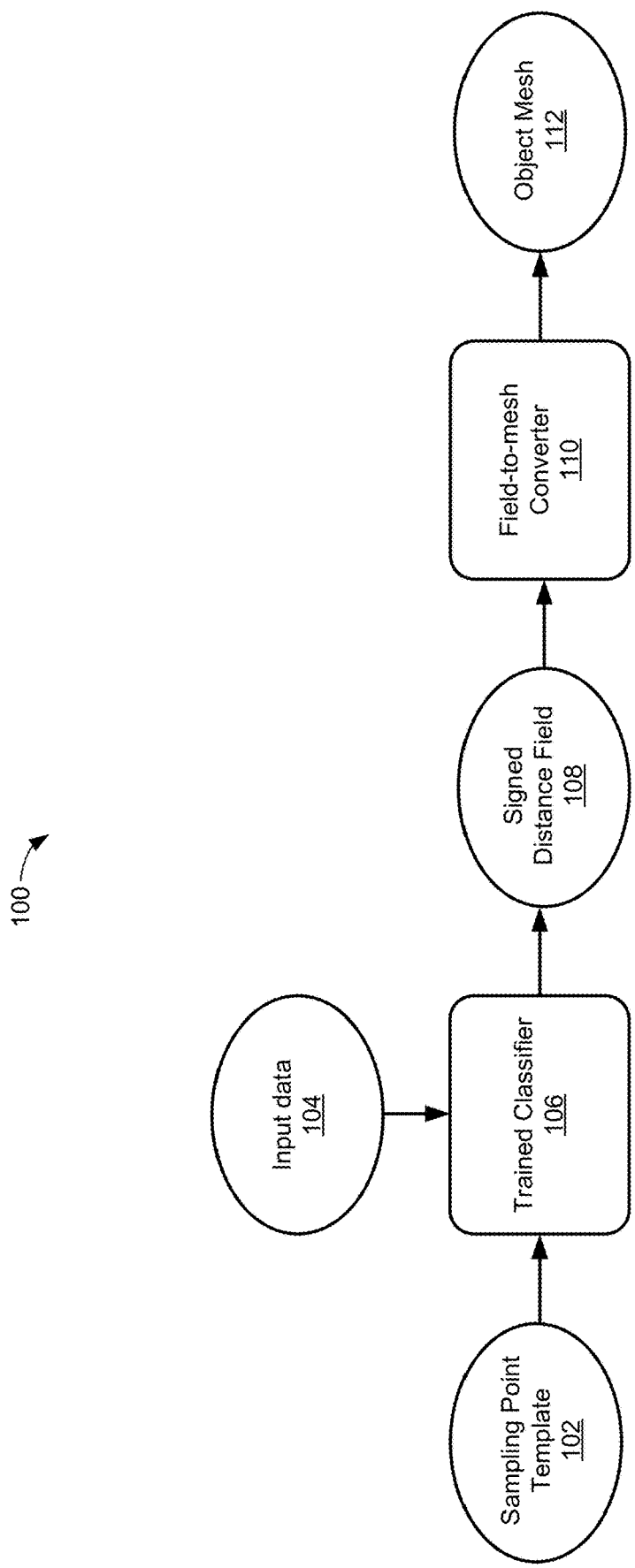
FIG. 1 is a diagram illustrating an example architecture for object mesh generation in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

One approach for generating output meshes of 3D objects uses a neural distance field (NDF). An NDF is a neural network-based model that predicts the unsigned distance field (UDF) for arbitrary 3D shapes using a sparse point cloud as the input observation. An NDF directly regresses, for a point P, the distance to the surface with a learned function whose zero-level set represents the surface.

However, learning with UDF, as required by an NDF approach, is challenging. Some UDF-based learning requires extracting point clouds or meshes, or directly rendering an implicit surface onto an image, which requires finding its zero-level set. Conventional methods for finding the zero-level set by detecting transitions from inside to outside and vice versa (e.g., marching cubes and volume rendering) are not compatible with UDF. As an alternative, an NDF approach may infer the continuous unsigned distance field of a target object. Then based on the UDF, the NDF approach may compute the gradient flows of the inferred UDF. Further, dense 3D sampling points may be randomly generated in the 3D space. By using the gradient flows, the sample points can be pushed onto the surface. Finally, the NDF approach may use a ball-pivoting algorithm to convert the dense point cloud into a mesh.

Accordingly, there are challenges when using an NDF approach. For example, converting the unsigned distance field generated by NDF into a mesh is a time-consuming process that may introduce a large number of artifacts. To convert the UDF into a mesh, an NDF approach may require the generation of dense point cloud and leverages UDF's gradient field to iteratively push the points onto the target surface. Such a process is vulnerable to complex gradient landscapes, e.g., parts with many details, and could get stuck at a local minimum. In addition, reconstruction of a mesh from UDF may require use if a ball pivoting (BP) algorithm that has several drawbacks. For example, a BP algorithm is sensitive to the input ball radius. A slightly larger or smaller radius may lead to an incomplete meshing result. Additionally, a BP algorithm is prone to generate self-intersections and disconnected face patches with inconsistent normal even with surfaces of moderate complexity. Moreover, a BP algorithm is time-consuming, particularly when dealing with dense point clouds.

Another challenge with using an NDF approach is that learning an UDF is a regression task rather than a classification task (like for an SDF), which makes the training more complex. Another challenge with using an NDF approach is that it only applies to the task of point cloud completion (e.g., the input for an NDF is limited to point clouds). Therefore, many 3D learning tasks, such as single or multiple view 3D reconstruction, cannot be performed using an NDF approach.

Another approach for generating output meshes of 3D objects uses deep implicit surface point prediction networks. This approach presents a class of implicit representations called closest surface-point (CSP) representation. Instead of directly regressing the unsigned distance field of a target surface, CSP infers the closest point on the target shape with respect to a query point. After obtaining the closes surface point, the unsigned distance to the surface can be computed as the distance between the query point and the surface point. With additional information like the closest surface point, this approach simplifies computation of differential geometry properties, such as the tangent plane and the surface normal. The CSP approach may use a volume encoder and a shape decoder. For example, a point cloud is the input to the volume encoder to obtain a feature volume. The shape decoder is conditioned on the feature volume to obtain the closest surface point for query points.

Unlike NDF, which converts UDF to dense sampling points using gradient field and then convert the points to mesh using the BPA algorithm, the CSP approach leverages a multi-resolution surface extraction scheme and can directly a Marching Cubes algorithm with a small positive threshold to obtain the final mesh. Though it requires less steps and generates smoother surface than an NDF approach, the CSP approach also fails to obtain open surfaces with a single-layer mesh. A CSP approach has similar limitations with that of an NDF approach. For example, learning is a regression task rather than a classification task (like for an SDF), which makes the training more complex. Moreover, the CSP approach also only applies to the task of point cloud completion.

The embodiments described herein address the limitations and challenges presented with the NDF and CSP approaches. For example, a three-pole signed distance function (3PSDF) implicit representation can model complex 3D shapes containing both closed and open surfaces without a long or complex point-to-mesh conversion. In addition, a 3PSDF approach can directly generate single-layer open surfaces in mesh form by applying the Marching Cubes algorithm (e.g., in a similar manner as when converting a signed distance field (SDF) to a mesh). Due to extracting single-layer open surfaces, a 3PSDF does not introduce artifacts during the field-to-mesh conversion. Additionally, a 3PSDF approach can use classification network learning, e.g., a 3PSDF approach infers to which category a query point belongs (e.g., inside, outside, or null). This can significantly reduce the difficulty of learning for a 3PSDF approach as compared to an NDF approach or a CSP approach. Moreover, a 3PSDF approach can handle broader and much more challenging tasks, such as 3D shape reconstruction from a single image.

In accordance with some embodiments, a 3PSDF approach can represent highly intricate 3D shapes containing both closed and open surfaces with high fidelity. In addition, a 3PSDF approach inherits benefits of a SDF approach, such as making the learning a (easy-to-train) classification task; and being compatible with iso-surface extraction techniques (e.g., the Marching Cubes algorithm) to achieve efficient field-to-mesh conversions. An example learning methodology for a 3PSDF approach is based on a classification neural network that classifies query points into three categories: inside, outside, and null. The resulting labels can be converted back to a 3PSDF using a mapping function to obtain a meshing result. Thus, a 3PSDF approach can be used in tasks related to 3D modeling and reconstruction, e.g., shape auto-encoding, point cloud completion, single-view 3D shape reconstruction, and multi-view 3D shape reconstruction.

Turning now to the Figures, FIG. 1 is a diagram illustrating an architecture 100 for object mesh generation in accordance with some embodiments. The architecture 100 includes a trained classifier 106 and a field-to-mesh converter 110. In accordance with some embodiments, the trained classifier 106 obtains a sampling point template 102 and input data 104 (e.g., an input observation) and generates a signed distance field 108. The field-to-mesh converter 110 obtains the signed distance field 108 and generates an object mesh 112. In some embodiments, the trained classifier 106 includes multiple perception layers. In some embodiments, the trained classifier 106 includes multiple 1D convolutional layers.

For example, the architecture 100 intakes regular sampling points along with other input observations that are used in the training time and infers a three-pole signed distance value for each query sampling point. The regular sampling points along with the three-pole signed distance value at each point location form the generated three-pole signed distance field 108, which can be converted to an output mesh using a conventional field-to-mesh technique, such as the Marching Cubes (MC) algorithm.

In some embodiments, once the classifier is trained, each query point can be labeled with a prediction. For example, to extract an iso-surface, the inferred discrete labels are converted to the 3PSDF representation (e.g., points with labels 0, 1, and 2 are assigned with SDF values as −1, 1, and NaN, respectively). The reconstructed surface can then be extracted as zero-level surface.

In some embodiments, an iso-surface with a 3PSDF represented is directly extracted using the Marching Cubes algorithm. During extraction, a null value prevents the MC algorithm from extracting a valid iso-surface at locations that contain no shapes. In some embodiments, in the vicinity of a target surface, the iso-surface extraction is performed in the same way as a conventional signed distance field. In some embodiments, after the MC computation, NaN vertices and faces generated by null cubes are removed and the remaining vertices and faces serve as the meshing result.

Figure 2:
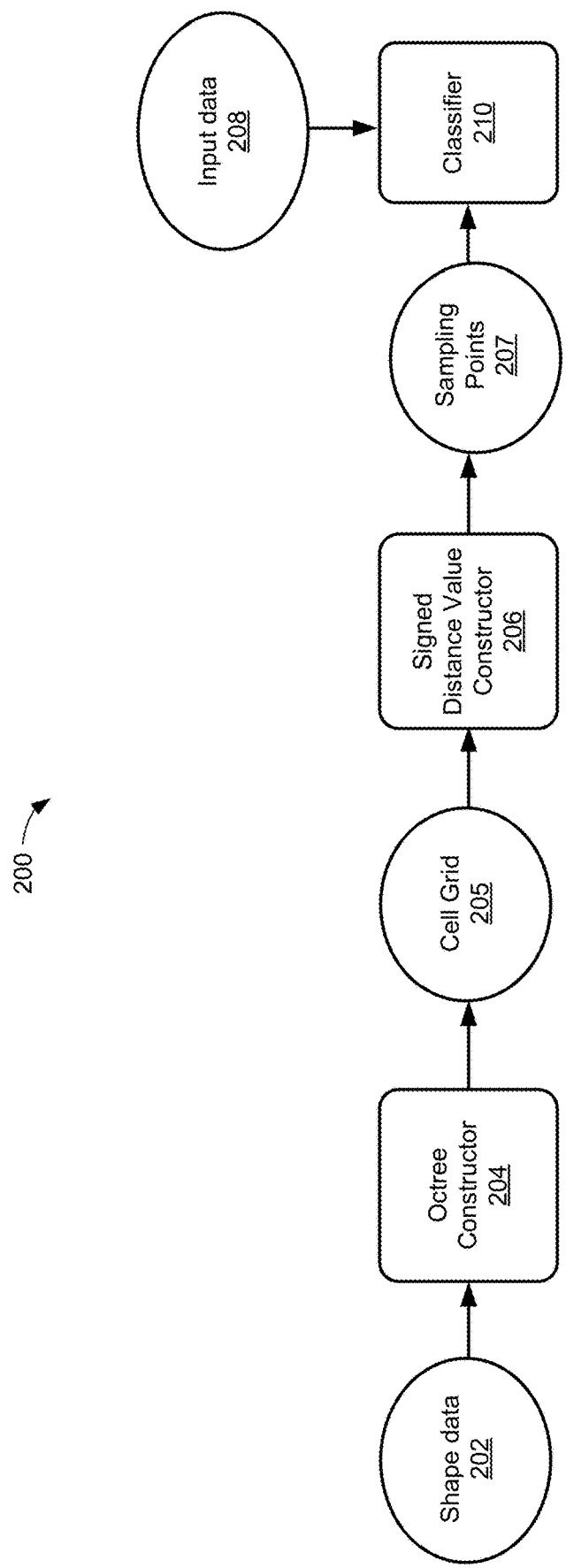
FIG. 2 is a diagram illustrating an example architecture for classifier training in accordance with some embodiments.

FIG. 2 is a diagram illustrating an architecture 200 for classifier training in accordance with some embodiments. In accordance with some embodiments, the architecture 200 includes an octree constructor 204, a signed distance value constructor 206, and a classifier 210. In the example of FIG. 2, the octree constructor 204 obtains shape data 202 and generates a cell grid 205 for the shape data 202. The signed distance value constructor 206 obtains the cell grid 205 for the shape data 202 and generates sampling points 207. The classifier 210 is trained using the sampling points 207 and input data 208. In some embodiments, the classifier 210 is a three-way classifier.

In some embodiments, the shape data 202 includes multiple 3D shapes. In some embodiments, the octree constructor 204 generates adaptive octree cells for a 3D shape for using in computing the three-pole signed distance field. In some embodiments, the corner points of the octree cells are used as the input sampling points 207. In some embodiments, the input data 208 includes images and point clouds. For example, for single-view 3D reconstruction, the sampling points 207 include 3D sampling points with ground-truth 3PSDF values; and the input data 208 includes corresponding single-view images. In some embodiments, the input data 208 includes a sparse point cloud. In this way, the classifier 210 is trained to classify, for each input sampling point, the category to which it belongs (e.g., inside, outside or NaN).

Though the introduction of the null sign provides the flexibility of eliminating unwanted surfaces, the NaN value may not be used for some computations, including computing a gradient required for updating a deep neural network. To avoid this issue, instead of applying the network to directly regress the signed distance value, the learning of a 3PSDF is formulated as a classification problem in accordance with some embodiments.

In some embodiments, the 3D function is approximated with a neural network that infers per-point labels: {in, out, null}. The label semantics can be represented using discrete numbers without loss of generality. In some embodiments, the classifier 210 learns a mapping function o: $R^3 \to \{0, 1, NaN\}$, where the labels {0, 1, NaN} represent inside, outside, and null respectively.

In some embodiments, the classifier 210 (e.g., a network) is conditioned on an input for downstream tasks (e.g., 3D reconstruction) based on observation(s) of the object (e.g., a point cloud or image). Accordingly, in addition to the sampling points 207 (e.g., a coordinate of points $p \in R^3$), the classifier 210 also intakes the input data 208 (e.g., an observation of object $x \in X$) as input. In some embodiments, a mapping function is parameterized by a neural network $\Phi_\theta$ that takes a pair (p,x) as input and outputs a three-class label as shown in Equation 1 below.

$$\Phi_\theta(p,x): R^3 \times \chi \to \{0,1,2\}$$ Equation 1: Mapping Function In some embodiments, the classifier 210 is trained using batches of point samples to learn the parameters θ of the neural network $\Phi_\theta(p,x)$. For example, for the i-th sample in a training batch, N points are sampled, where $p_{ij} \in R^3$, j=1, ..., N. The mini-batch loss, $L_B$, is shown in Equation 2 below.

Loss Function $$\mathcal{L}_\mathcal{B} = \frac{1}{|\mathcal{B}|N} \sum_{i=1}^{|\mathcal{B}|} \sum_{j=1}^{N} \mathcal{L}(\Phi_\theta(p_{ij}, x_i), y_{ij}),$$ Equation 2 where L(•,•) computes the cross-entropy loss, $x_i$ is the i-th observation of batch B, and $y_{ij}$ denotes the ground-truth label for point $p_{ij}$.

In some embodiments, each training sample is embedded with a 512-dimensional latent code, and the classifier 210 is trained to reconstruct a 3D shape from the embedding.

In some embodiments, the 3PSDF computation is performed per cell. Therefore, in some scenarios, it is preferable to reduce or minimize geometric details and open surfaces in individual cells. Accordingly, in some embodiments, the octree constructor 204 subdivides a cell only if the cell intersects with the input shape. As the subdivision depth increases, the complexity of the surface contained in each local cell decreases, which can improve approximation accuracy. Since regions containing no shapes are not further divided, a trade-off is obtained between the computational complexity and reconstruction accuracy.

Figure 3:
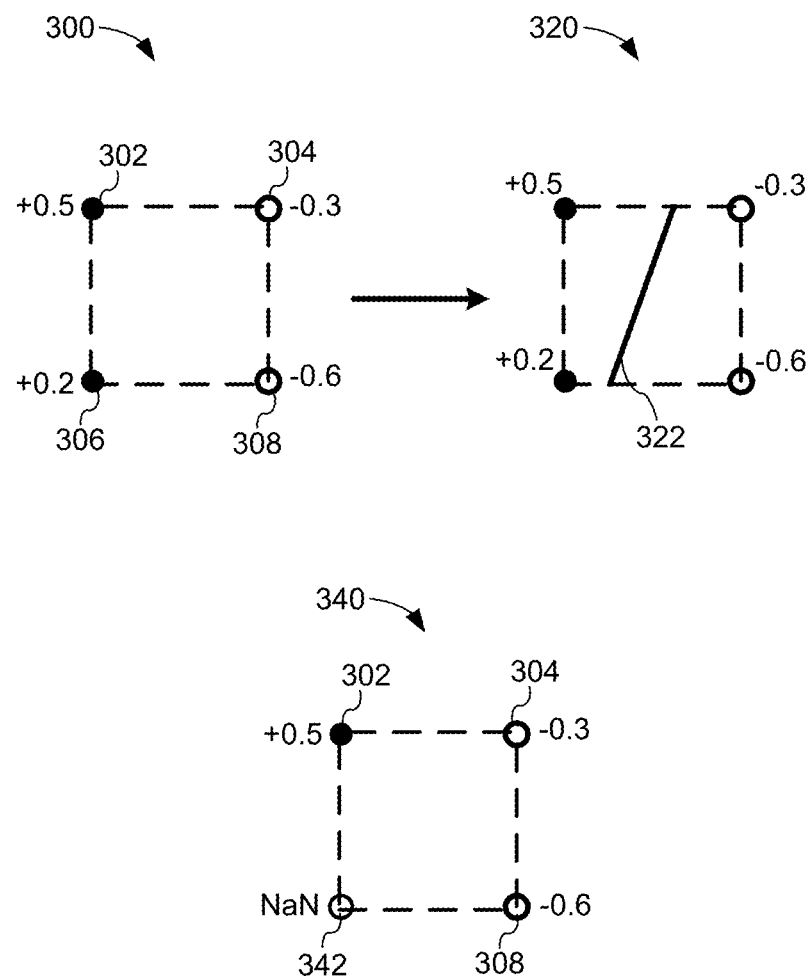
FIG. 3 is a diagram illustrating example signed distance field unit cells in accordance with some embodiments.

FIG. 3 is a diagram illustrating signed distance field unit cells 300, 320, and 340 in accordance with some embodiments. The 2D signed distance field unit cell 300 includes points 302, 304, 306, and 308. The points 302 and 306 have corresponding values of 0.5 and 0.2 respectively and therefore map to being outside of a surface in accordance with some embodiments. The points 304 and 308 have corresponding values of −0.3 and −0.6 respectively and therefore map to being inside of a surface in accordance with some embodiments. The 2D signed distance field unit cell 320 includes a surface 322 extracted from the points 302, 304, 306, and 308. The 2D signed distance field unit cell 340 is the same as the 2D signed distance field unit cell 300 except that the point 306 in the 2D signed distance field unit cell 300 is replaced by the point 342 in 2D signed distance field unit cell 340. The point 342 has a value of NaN that maps to a null sign in accordance with some embodiments. The inclusion of the point 342 in the 2D signed distance field unit cell 340 prevents extraction of a surface in accordance with some embodiments (e.g., if any point in a unit cell has a NaN value than no surface is extracted).

A watertight 3D shape can be implicitly represented by a signed distance function. Given a 3D query point $p \in R^3$, deep neural networks can be applied to either predict the occupancy of p as $f(p): R^3 \to [0,1]$ or directly regress SDF as $f(p): R^3 \to R$. In this way, the formation of a closed surface occurs when both the positive and negative signs exist in the space.

For a signed distance function with the ability of representing open surfaces, a third direction-less pole (e.g., the null sign) is incorporated into the conventional signed distance field. For example, no iso-surfaces are formed at the bisector of either positive/null or negative/null pairs. In this way, the null sign acts as a surface eliminator that prevents unwanted surfaces and thus can flexibly cast arbitrary topologies, including those with open surfaces. Incorporation of the direction-less pole means that for a 3D point $p \in R^3$, in addition to a continuous signed distance, p can also be mapped to a null value: $\Psi(p):R^3 \to \{R,nan\}$. Hence, given an input surface S, a mapping function $\Psi$ may be learned to minimize a surface-to-surface distance as shown in Equation 3 below.

Suface-to-Surface Distance $$\arg\min_{\Psi} \|S - \mathcal{M}(\Psi(p))\|, \quad \text{Equation 3}$$

where $\mathcal{M}$ is the meshing operator that converts the resulting field into an explicit surface and $\|\cdot\|$ returns the surface-to-surface distance.

Figure 4A:
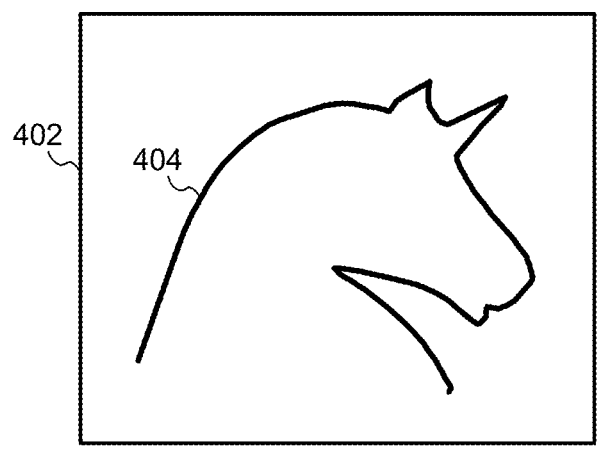
FIGS. 4A-4D are diagrams illustrating application of example signed distance fields in accordance with some embodiments.
Figure 4B:
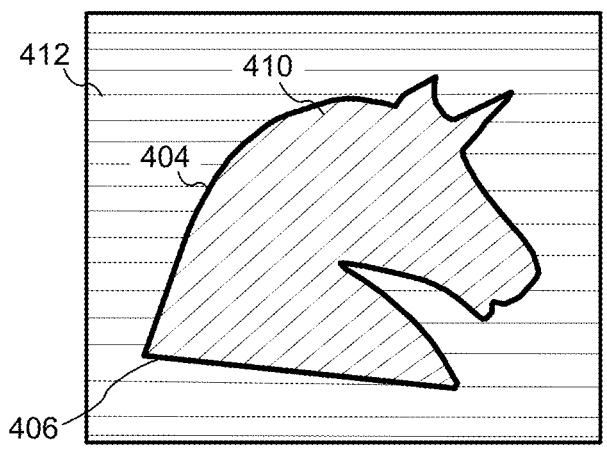

FIGS. 4A-4D are diagrams illustrating application of example signed distance fields in accordance with some embodiments. FIG. 4A illustrates a space 402 having a 2D shape 404 (e.g., a unicorn head). As shown in FIG. 4A, the shape 404 is open at the bottom (e.g., has an open surface). FIG. 4B illustrates a SDF applied to the space 402 with diagonal lines 410 representing inside locations and horizontal lines 412 representing outside locations. Because SDF can only represent closed surfaces, the shape 404 is closed in FIG. 4B by adding the line 406 at the bottom.

Figure 4C:
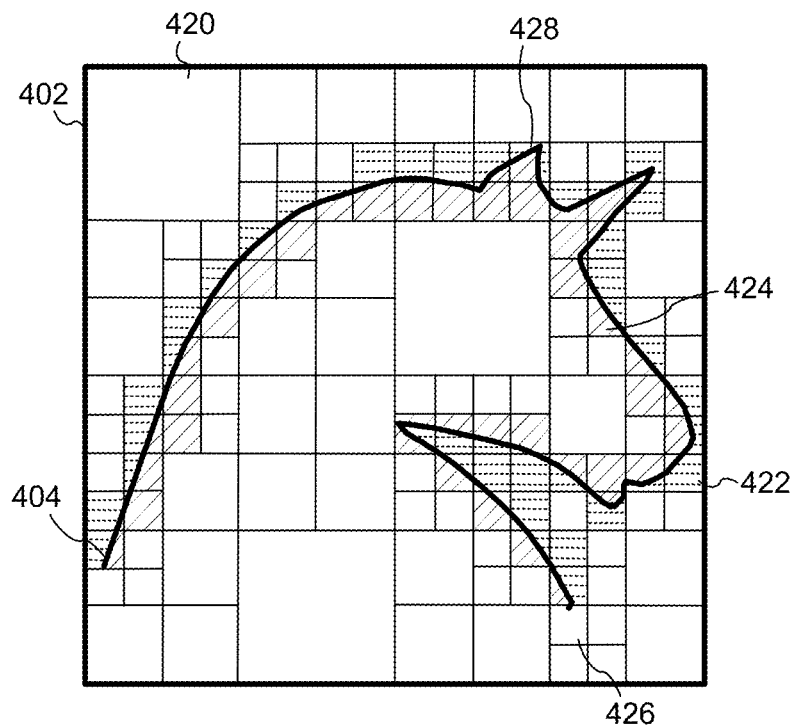

FIG. 4C illustrates an octree-based subdivision applied to the space 402 resulting in unit cells 420. FIG. 4C further illustrates a 3PSDF applied to the space 402 with diagonal lines 424 representing inside locations, horizontal lines 422 representing outside locations, and empty unit cells (e.g., no lines) representing null (direction-less) locations.

Figure 4D:

FIG. 4D illustrates a unit cell 426 (from FIG. 4C) having an open surface (e.g., a partial line) 432. In some embodiments, an approximation error occurs when applying 3PSDF to the unit cell 426 as no surface is formed. In some embodiments, the approximation error resulting from open surfaces within unit cells is reduced or minimized by applying finer space decomposition (e.g., continue to subdivide the space 402 until no unit cell has an open surface). FIG. 4D further illustrates a unit cell 428 (from FIG. 4C) having a complex (e.g., non-linear) surface 434. The unit cell 428 includes surface-normal lines 438 used to determine inside and outside locations in accordance with some embodiments.

For non-watertight surface (e.g., without closed boundaries) an in-or-out test for a query point is insufficient. In some embodiments, a surface normal is used to determine a sign of the distance for a query point. In some embodiments, the space is decomposed into a grid of local cells. As shown in FIG. 4C, for each cell 420 ($C_i$), if it does not contain a surface, the cell space is set as a null region and any sample point $p_i$ that lies inside $C_i$ has a NaN distance to the target surface S as shown in Equation 4 below.

$$\Psi(p_i,S)=nan, \text{ if } p_i \in C_i \text{ and } C_i \cap S = \emptyset \quad \text{Equation 4: NaN Distance}$$

For a local cell $C_i$ that encloses a surface patch Si, given a query point $p_i \in C_i$, $p_i$'s closest point $q_i$ on Si is determined. First, the surface normal at $q_i$ is set as $n(q_i)$. If the vector $\overrightarrow{q_i p_i}$ aligns with n(qi) (e.g., $n(q_i) \cdot \overrightarrow{q_i p_i} \geq 0$), $p_i$'s distance to the input surface S is set as positive; otherwise, it is set as negative as shown in Equation 5 below.

Vector Alignment $$\Psi(p_i, S_i) = \begin{cases} d(p_i, S_i) & \text{if } n(q_i) \cdot \overrightarrow{q_i p_i} \geq 0 \\ -d(p_i, S_i) & \text{otherwise} \end{cases}, \quad \text{Equation 5}$$

where $d(p,S_i)$ returns the absolute distance between $p_i$ and Si.

In some scenarios, with finer decomposition of 3D space, cells containing geometry distribute around the surface of interest while the null cells occupy the majority of the space. This differs from a conventional signed distance field, where the entirety of the space is filled with distances of either positive or negative sign (e.g., as illustrated in FIG. 4B). Thus, the 3PSDF may better reflect the nature of a 3D surface of any topology in that there is a high sparsity of surface occupancy.

Figure 5A:
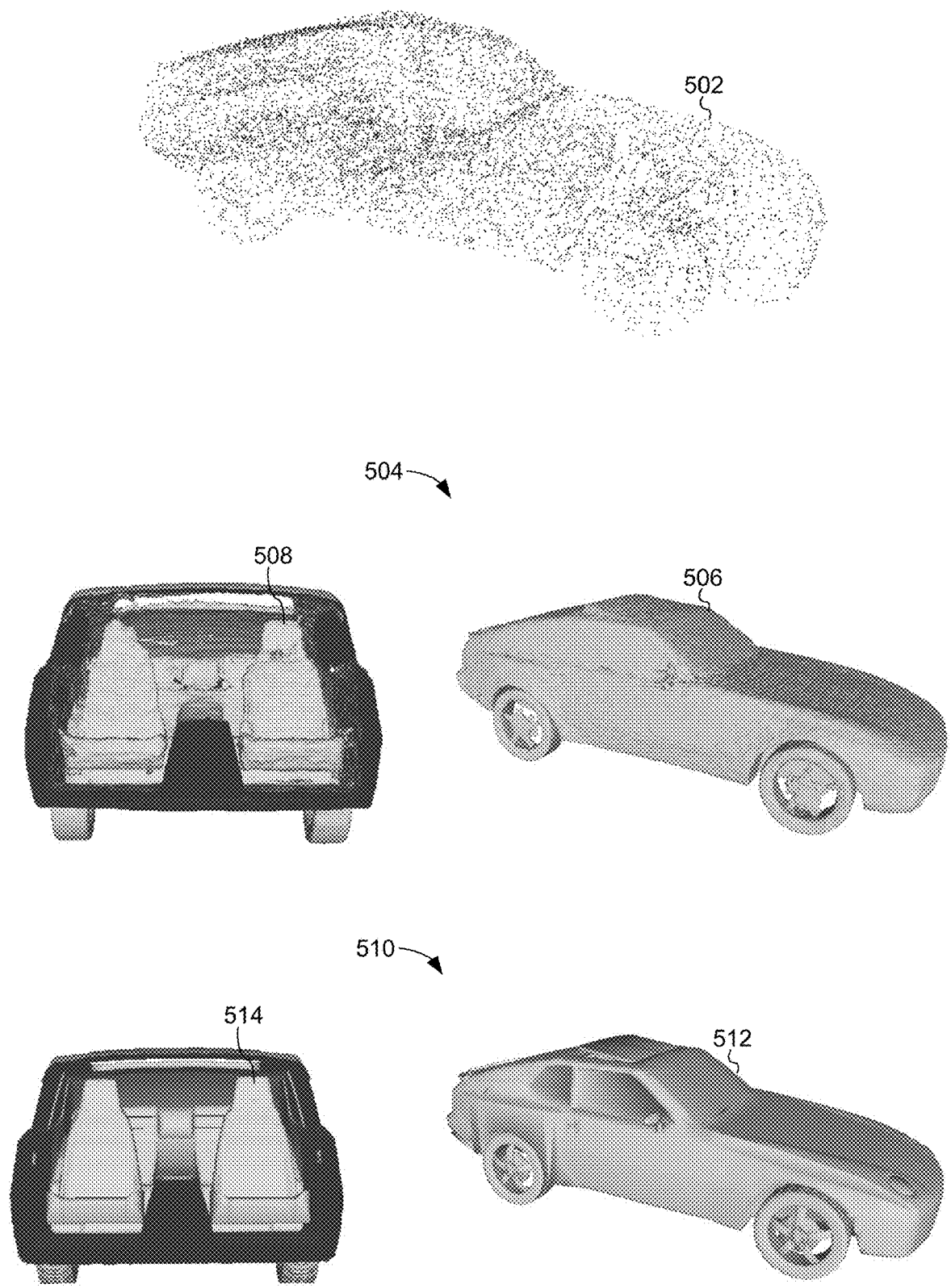
FIGS. 5A-5B are diagrams illustrating example input observations and output meshes in accordance with some embodiments.
Figure 5B:
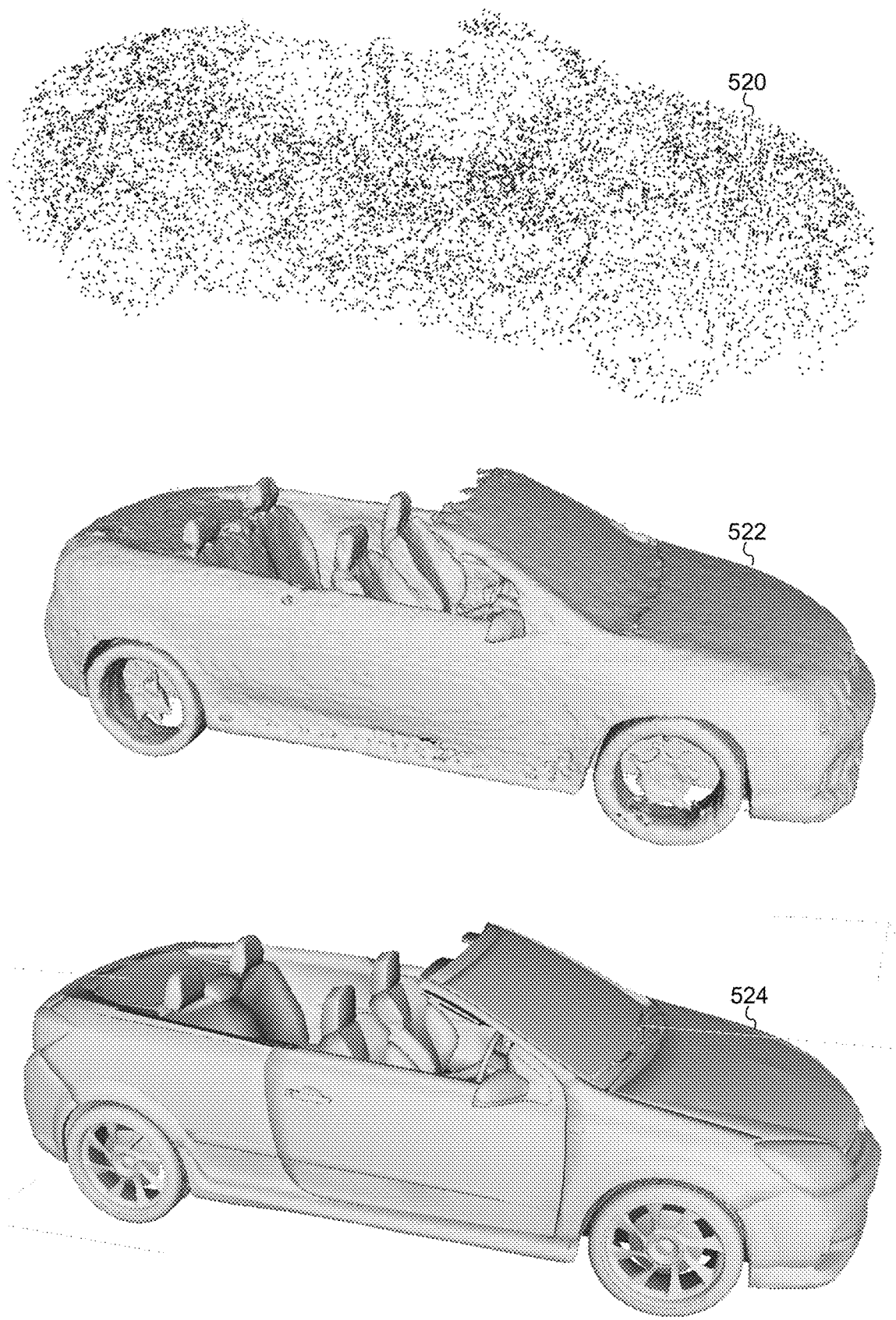

FIGS. 5A-5B are diagrams illustrating example input observations and output meshes in accordance with some embodiments. In particular, FIGS. 5A-5B show visual comparisons of point cloud completion on non-watertight data with open surfaces. FIG. 5A shows an input observation 502 (e.g., a point cloud for a car) and a corresponding 3PSDF mesh 504 generated from the input observation. The 3PSDF mesh 504 includes external surfaces 506 and internal surfaces 508. FIG. 5A further shows a ground truth mesh 510 (e.g., the mesh from which the input observation 502 was generated) with external surfaces 512 and internal surfaces 514. FIG. 5B shows an input observation 520 (e.g., a point cloud for a convertible car), a corresponding 3PSDF mesh 522 generated from the input observation, and a ground truth mesh 524 (e.g., the mesh from which the input observation 520 was generated).

Figure 6A:
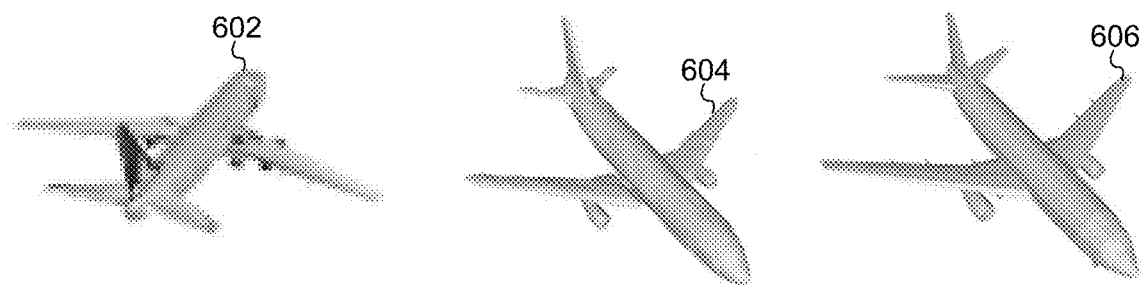
FIGS. 6A-6C are diagrams illustrating example input observations and output meshes in accordance with some embodiments.
Figure 6B:
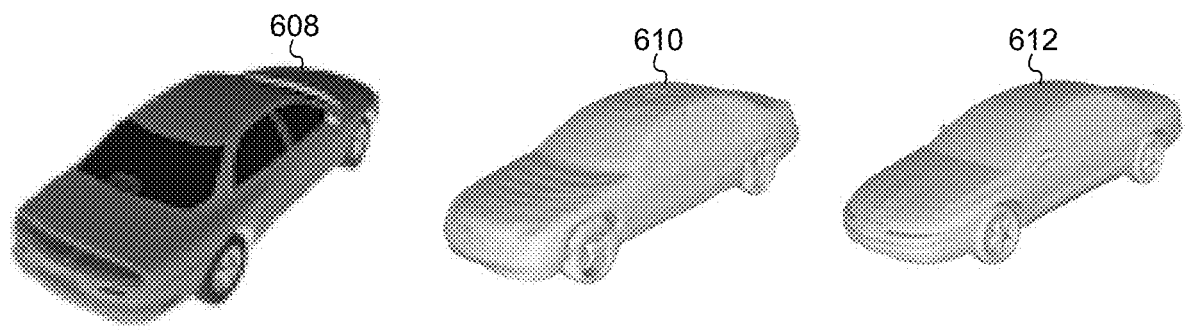
Figure 6C:
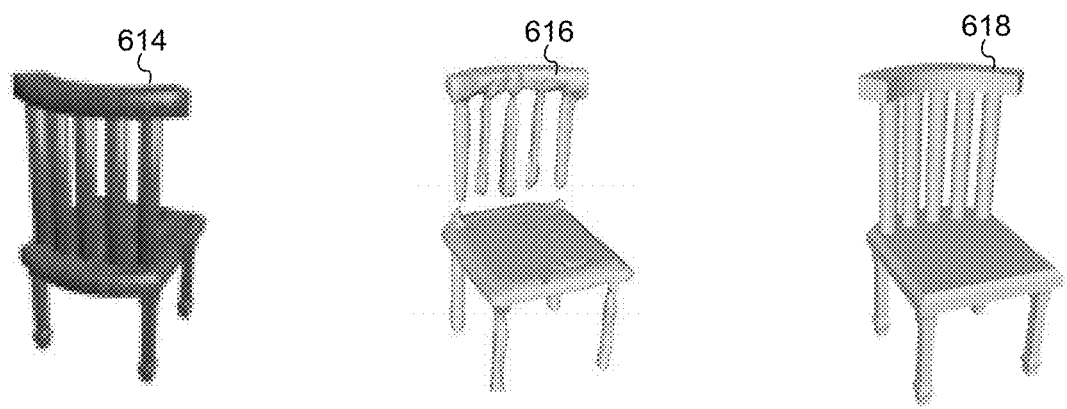

FIGS. 6A-6C are diagrams illustrating example input observations and output meshes in accordance with some embodiments. FIG. 6A shows an image 602 (e.g., a single image input observation) of an airplane, a corresponding 3PSDF mesh 604, and a ground truth mesh 606. In particular, FIG. 6A shows a different perspective of the airplane in the image 602 using the 3PSDF mesh 604. FIG. 6B shows an image 608 of a car, a corresponding 3PSDF mesh 610, and a ground truth mesh 612. In particular, FIG. 6B shows a different perspective of the car in the image 608 using the 3PSDF mesh 610. FIG. 6C shows an image 614 of a chair, a corresponding 3PSDF mesh 616, and a ground truth mesh 618. In particular, FIG. 6C shows a different perspective of the chair using the 3PSDF mesh 616.

Figure 7:
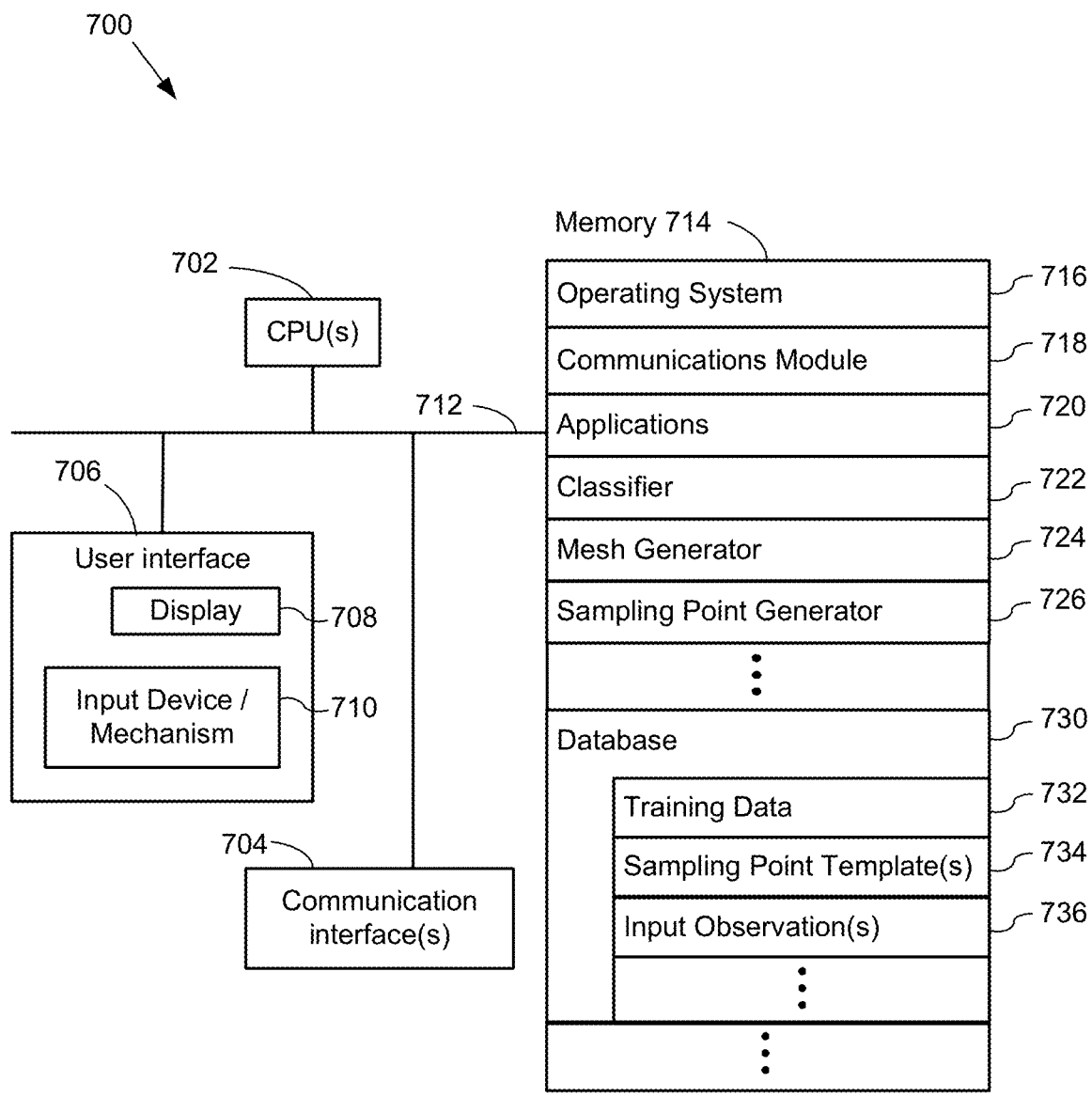
FIG. 7 is a block diagram illustrating an example computing system in accordance with some embodiments.

FIG. 7 is a block diagram illustrating a computing system 700 in accordance with some embodiments. Various examples of the computing system 700 include a desktop computer, a laptop computer, a tablet computer, a server system, and other computing devices that have a processor capable of running a classifier 722. The computing system 700 typically includes one or more processing units/cores (CPUs) 702 for executing modules, programs, and/or instructions stored in memory 714 and thereby performing processing operations; one or more network or other communications interfaces 704; the memory 714; and one or more communication buses 712 for interconnecting these components. The communication buses 712 may include circuitry that interconnects and controls communications between system components.

The computing system 700 optionally includes a user interface 706 comprising a display device 708 and one or more input devices or mechanisms 710. In some embodiments, the input devices include a keyboard and/or mouse. In some embodiments, the input devices include a "soft" keyboard, which is displayed as needed on the display device 708, enabling a user to "press keys" that appear on the display 708. In some embodiments, the display 708 and input devices 710 include a touch screen display (also called a touch sensitive display).

In some embodiments, the memory 714 includes high-speed random-access memory, such as DRAM, SRAM, DDR RAM or other random-access solid-state memory devices. In some embodiments, the memory 714 includes non-volatile memory, such as one or more magnetic disk storage devices, optical disk storage devices, flash memory devices, or other non-volatile solid state storage devices. In some embodiments, the memory 714 includes one or more storage devices remotely located from the CPU(s) 702. The memory 714, or alternately the non-volatile memory device(s) within the memory 714, is, or includes, a non-transitory computer readable storage medium. In some embodiments, the memory 714, or the computer readable storage medium of the memory 714, stores the following programs, modules, and data structures, or a subset thereof:
- an operating system 716, which includes procedures for handling various basic system services and for performing hardware dependent tasks;
- a communications module 718, which is used for connecting the computing system 700 to other computers and devices via the one or more communication network interfaces 704 (wired or wireless) and one or more communication networks, such as the Internet, other wide area networks, local area networks, metropolitan area networks, and so on;
- one or more applications 720 that perform particular tasks or sets of tasks for a user (e.g., word processors, media players, web browsers, and communication platforms);
- a classifier 722 (e.g., the classifier 106) for determining surface functions for input data. In some embodiments, the classifier 722 includes one or more neural networks;
- a mesh generator 724 (e.g., the field-to-mesh converter 110) for generating object meshes from signed distance fields. In some embodiments, the mesh generator 724 includes a Marching Cubes algorithm and/or a Marching Tetrahedras algorithm;
- a sampling point generator 726 (e.g., the octree constructor 204 and the signed distance value constructor 206) for generating sampling points for use with input data; and
- one or more databases 730, which are used by the applications 720, the classifier 722, the mesh generator 724, and/or the sampling point generator 726. In accordance with some embodiments, the one or more databases 730 include training data 732, sampling point template(s) 734, and/or input observation(s) 736.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 714 stores a subset of the modules and data structures identified above. Furthermore, the memory 714 may store additional modules or data structures not described above.

Although FIG. 7 shows a computing system 700, FIG. 7 is intended more as a functional description of the various features that may be present rather than as a structural schematic of the embodiments described herein. In practice, and as recognized by those of ordinary skill in the art, items shown separately could be combined and some items could be separated.

Figure 8A:
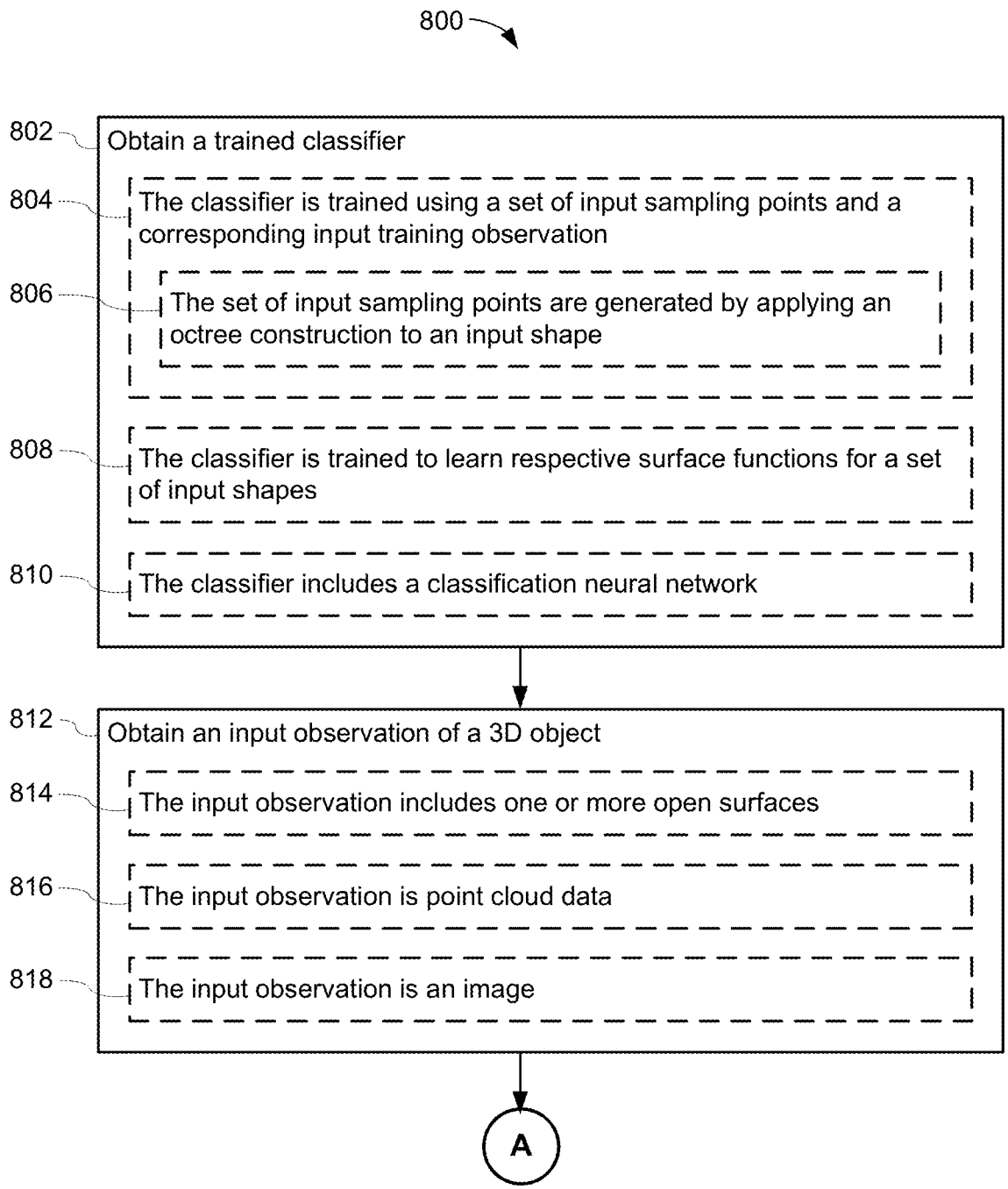
FIGS. 8A-8B are flowcharts illustrating an example method for generating output meshes of 3D objects in accordance with some embodiments.
Figure 8B:
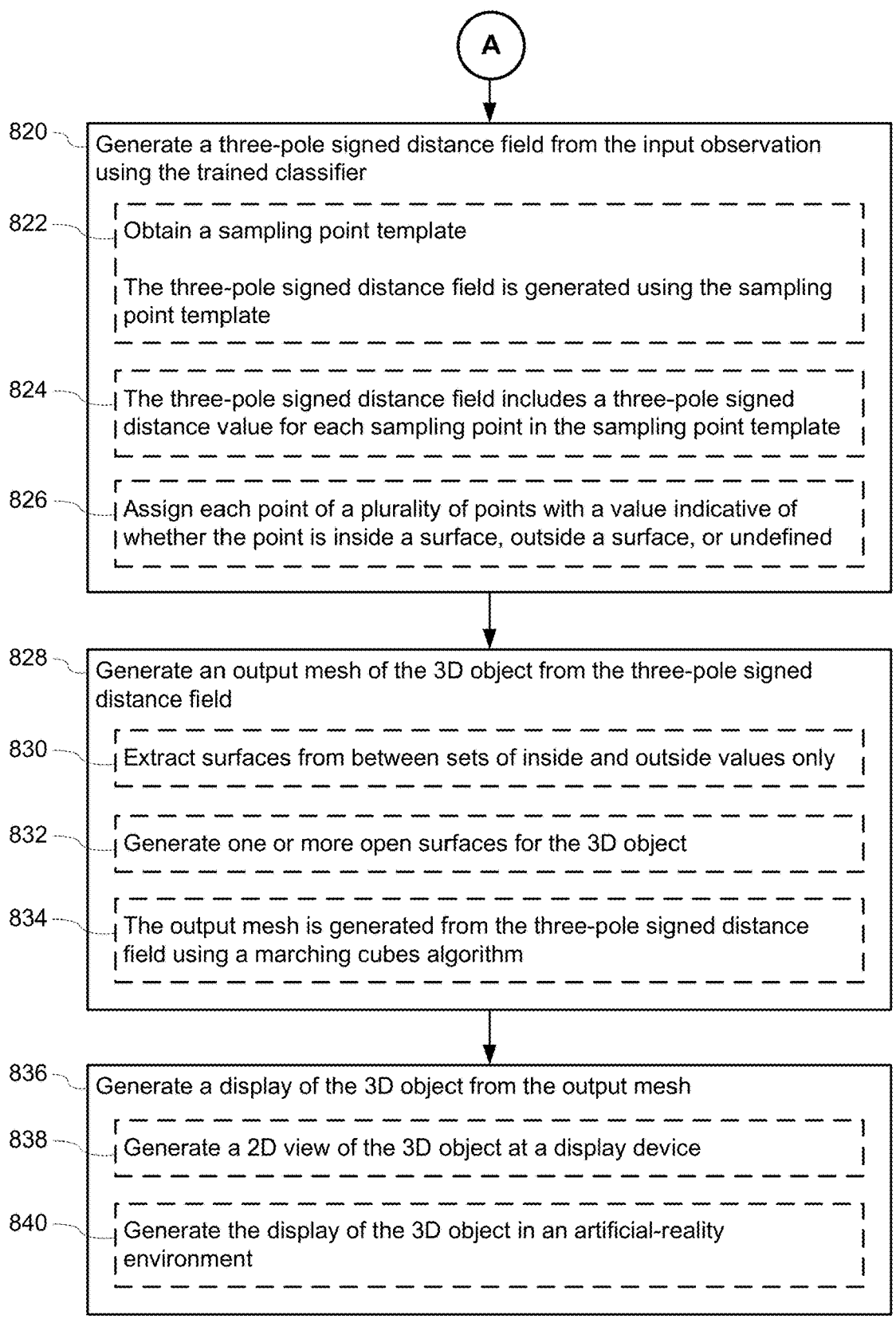

FIGS. 8A-8B are flowcharts illustrating a method 800 for generating output meshes of 3D objects in accordance with some embodiments. The method 800 is performed at a computing system (e.g., the computing system 700) having one or more processors and memory. In some embodiments, the memory stores one or more programs configured for execution by the one or more processors.

The computing system obtains (802) a trained classifier (e.g., the trained classifier 106). In some embodiments, the trained classifier is obtained via a training process (e.g., as illustrated in FIG. 2).

In some embodiments, the classifier is trained using (804) a set of input sampling points and a corresponding input training observation. For example, the classifier 210 is trained using the sampling points 207 and the input data 208. In some embodiments, the classifier 210 is the trained classifier 106 after the training process is performed.

In some embodiments, the set of input sampling points are generated by applying (806) an octree construction to an input shape. For example, the sampling points 207 are generated via the octree constructor 204 and the signed distance value constructor 206.

In some embodiments, the classifier is trained (808) to learn respective surface functions for a set of input shapes. For example, the classifier 210 is trained to learn surface functions for the shape data 202 (e.g., the mapping function of Equation 1).

In some embodiments, the classifier (e.g., the classifier 722) includes (810) a classification neural network (e.g., the neural network $\Phi_\theta$). In some embodiments, the classifier includes multiple perception layers. In some embodiments, the classifier includes multiple 1D convolutional layers.

The computing system obtains (812) an input observation (e.g., the input data 104) of a 3D object. In some embodiments, the input observation includes (814) one or more open surfaces (e.g., as illustrated in FIG. 6A). In some embodiments, the input observation is (816) point cloud data (e.g., the point cloud data 502 or 520). In some embodiments, the input observation is (818) an image (e.g., the images 602, 608, or 614).

The computing system generates (820) a three-pole signed distance field (e.g., the signed distance field 108) from the input observation using the trained classifier. In some embodiments, the computing system obtains (822) a sampling point template (e.g., the sampling point template 102), and the three-pole signed distance field is generated using the sampling point template. In some embodiments, the three-pole signed distance field includes (824) a three-pole signed distance value for each sampling point in the sampling point template.

In some embodiments, the computing system assigns (826) each point of a plurality of points with a value indicative of whether the point is inside a surface, outside a surface, or undefined (e.g., as illustrated in FIG. 4C).

The computing system generates (828) an output mesh of the 3D object from the three-pole signed distance field (e.g., using the mesh converter 724). In some embodiments, the output mesh is generated (834) from the three-pole signed distance field using a marching cubes algorithm.

In some embodiments, the computing system extracts (830) surfaces from between sets of inside and outside values only. For example, the system does not extract surfaces between signed points and a null/NaN point as illustrated in FIG. 3. In some embodiments, the computing system generates (832) one or more open surfaces for the 3D object (e.g., as illustrated in FIGS. 5A-5B).

The computing system generates (836) a display of the 3D object from the output mesh (e.g., displayed at the display 708). In some embodiments, the computing system generates (838) a 2D view of the 3D object at a display device (e.g., a perspective view as illustrated in FIGS. 6A-6C). In some embodiments, the computing system generates (840) the display of the 3D object in an artificial-reality environment.

In light of these principles, we now turn to certain embodiments.

(A1) In one aspect, some embodiments include a method (e.g., the method 800) performed at a computing system (e.g., the computing system 700) having memory and one or more processors. The method includes: (i) obtaining a trained classifier (e.g., the classifier 106); (ii) obtaining an input observation of a 3D object (e.g., the input data 104); (iii) generating a three-pole signed distance field (e.g., the signed distance field 108) from the input observation using the trained classifier; (iv) generating an output mesh of the 3D object (e.g., the object mesh 112) from the three-pole signed distance field; and (v) generating a display of the 3D object from the output mesh.

(A2) In some embodiments of A1, the method further includes obtaining a sampling point template (e.g., the sampling point template 102), where the three-pole signed distance field is generated using the sampling point template. In some embodiments, the sampling point template includes a regular set (e.g., grid) of sampling points for the input observation.

(A3) In some embodiments of A1 or A2, the three-pole signed distance field includes a three-pole signed distance value (e.g., 1, −1, or NaN) for each sampling point in the sampling point template.

(A4) In some embodiments of any of A1-A3, generating the three-pole signed distance field from the input observation includes assigning each point of a plurality of points with a value indicative of whether the point is inside a surface, outside a surface, or undefined. For example, a negative value corresponds to a point inside the surface, a positive value corresponds to a point outside the surface, and a not-a-number (NaN) or null value corresponds to an undefined point.

(A5) In some embodiments of A4, generating the output mesh includes extracting surfaces from between sets of inside and outside values only (e.g., as illustrated in FIG. 3).

(A6) In some embodiments of any of A1-A5, the input observation includes one or more open surfaces (e.g., as illustrated in FIGS. 5A-5B).

(A7) In some embodiments of any of A1-A6, generating the output mesh of the 3D object from the three-pole signed distance field includes generating one or more open surfaces for the 3D object.

(A8) In some embodiments of any of A1-A7, the input observation is point cloud data (e.g., the point cloud data 502 or 520).

(A9) In some embodiments of any of A1-A7, the input observation is an image (e.g., a 2D image as illustrated in FIGS. 6A-6C).

(A10) In some embodiments of any of A1-A9, the output mesh is generated from the three-pole signed distance field using a marching cubes algorithm. In some embodiments, the output mesh is generated using a marching tetrahedras algorithm. In some embodiments, the output mesh is generated using an iso-surface extraction technique.

(A11) In some embodiments of any of A1-A10, the classifier is trained using a set of input sampling points and a corresponding input training observation (e.g., a labeled input training observation). For example, FIG. 2 illustrates a training architecture 200 for training the classifier 210.

(A12) In some embodiments of A11, the set of input sampling points are generated by applying an octree construction to an input shape. For example, the input sampling points are corner points of the octree cells. In some embodiments, applying the octree construction includes subdividing a local cell only if it intersects a surface of the input shape. In some embodiments, the set of input sampling points include a regular set of sampling points (e.g., not specific to an input shape).

(A13) In some embodiments of any of A1-A12, the classifier is trained to learn respective surface functions for a set of input shapes.

(A14) In some embodiments of any of A1-A13, the classifier includes a classification neural network.

(A15) In some embodiments of any of A1-A14, generating the display of the 3D object includes generating a 2D view of the 3D object at a display device (e.g., the display 708).

(A16) In some embodiments of any of A1-A15, generating the display of the 3D object includes generating the display of the 3D object in an artificial-reality environment (e.g., a virtual reality or augmented reality environment).

In another aspect, some embodiments include a computing system including one or more processors and memory coupled to the one or more processors, the memory storing one or more programs configured to be executed by the one or more processors, the one or more programs including instructions for performing any of the methods described herein (e.g., A1-A16 above).

In yet another aspect, some embodiments include a non-transitory computer-readable storage medium storing one or more programs for execution by one or more processors of a computing system, the one or more programs including instructions for performing any of the methods described herein (e.g., A1-A16 above).

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

It will also be understood that, although the terms first, second, etc. are, in some instances, used herein to describe various elements, these elements should not be limited by these terms. These terms are only used to distinguish one element from another. For example, a first object could be termed a second object, and, similarly, a second object could be termed a first object, without departing from the scope of the various described embodiments. The first object and the second object are both objects, but they are not the same object unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method performed at a computing system having memory and one or more processors, the method comprising:
   obtaining a trained classifier;
   obtaining an input observation of a 3D object;
   generating a three-pole signed distance field from the input observation using the trained classifier, wherein generating the three-pole signed distance field from the input observation comprises assigning each point of a plurality of points with a value indicative of whether the point is inside a surface, outside the surface, or undefined;
   generating an output mesh of the 3D object from the three-pole signed distance field, wherein generating the output mesh comprises extracting surfaces from between sets of inside and outside values only; and
   generating a display of the 3D object from the output mesh.

2. The method of claim 1, further comprising obtaining a sampling point template;
   wherein the three-pole signed distance field is generated using the sampling point template.

3. The method of claim 2, wherein the three-pole signed distance field includes a three-pole signed distance value for each sampling point in the sampling point template.

4. The method of claim 1, wherein the input observation includes one or more open surfaces.

5. The method of claim 1, wherein generating the output mesh of the 3D object from the three-pole signed distance field comprises generating one or more open surfaces for the 3D object.

6. The method of claim 1, wherein the input observation is point cloud data.

7. The method of claim 1, wherein the input observation is an image.

8. The method of claim 1, wherein the output mesh is generated from the three-pole signed distance field using a marching cubes algorithm.

9. The method of claim 1, wherein the classifier is trained using a set of input sampling points and a corresponding input training observation.

10. The method of claim 9, wherein the set of input sampling points are generated by applying an octree construction to an input shape.

11. The method of claim 1, wherein the classifier is trained to learn respective surface functions for a set of input shapes.

12. The method of claim 1, wherein the classifier comprises a classification neural network.

13. The method of claim 1, wherein generating the display of the 3D object comprises generating a 2D view of the 3D object at a display device.

14. The method of claim 1, wherein generating the display of the 3D object comprises generating the display of the 3D object in an artificial-reality environment.

15. A computing system, comprising:
   one or more processors;
   memory; and
   one or more programs stored in the memory and configured for execution by the one or more processors, the one or more programs comprising instructions for:
      obtaining a trained classifier;
      obtaining an input observation of a 3D object;
      generating a three-pole signed distance field from the input observation using the trained classifier, wherein generating the three-pole signed distance field from the input observation comprises assigning each point of a plurality of points with a value indicative of whether the point is inside a surface, outside the surface, or undefined;
      generating an output mesh of the 3D object from the three-pole signed distance field, wherein generating the output mesh comprises extracting surfaces from between sets of inside and outside values only; and
      generating a display of the 3D object from the output mesh.

16. The computing system of claim 15, wherein generating the output mesh of the 3D object from the three-pole signed distance field comprises generating one or more open surfaces for the 3D object.

17. The computing system of claim 15, wherein the one or more programs further comprise instructions for obtaining a sampling point template, wherein the three-pole signed distance field is generated using the sampling point template.

18. A non-transitory computer-readable storage medium storing one or more programs configured for execution by a computing device having one or more processors, memory, and a display, the one or more programs comprising instructions for:
   obtaining a trained classifier;
   obtaining an input observation of a 3D object;
   generating a three-pole signed distance field from the input observation using the trained classifier, wherein generating the three-pole signed distance field from the input observation comprises assigning each point of a plurality of points with a value indicative of whether the point is inside a surface, outside the surface, or undefined;
   generating an output mesh of the 3D object from the three-pole signed distance field, wherein generating the output mesh comprises extracting surfaces from between sets of inside and outside values only; and generating a display of the 3D object from the output mesh.

19. The non-transitory computer-readable storage medium of claim 18, wherein generating the output mesh of the 3D object from the three-pole signed distance field comprises generating one or more open surfaces for the 3D object.

20. The non-transitory computer-readable storage medium of claim 18, wherein the one or more programs further comprise instructions for obtaining a sampling point template, wherein the three-pole signed distance field is generated using the sampling point template.

\* \* \* \* \*